United States Patent [19]
Otto

[11] 3,729,741
[45] Apr. 24, 1973

[54] AUTOMOBILE ANTENNA SUPPORT

[76] Inventor: Oliver O. Otto, 2866 Tulare Avenue, Richmond, Calif. 94804

[22] Filed: Apr. 19, 1971

[21] Appl. No.: 135,322

[52] U.S. Cl..............................343/713, 224/42.1
[51] Int. Cl................................................H01q 1/32
[58] Field of Search....................343/702, 705, 711, 343/712, 713, 715; 224/42.1 F, 42.1 G, 42.1

[56] References Cited

UNITED STATES PATENTS

| | | | |
|---|---|---|---|
| 2,783,367 | 2/1957 | Locke | 224/42.1 F |
| 2,334,856 | 11/1943 | Atkinson | 343/712 |
| 3,056,570 | 10/1962 | Slavin | 343/715 |
| 3,154,786 | 10/1964 | Clanton | 343/713 |

FOREIGN PATENTS OR APPLICATIONS

| | | | |
|---|---|---|---|
| 890,825 | 7/1949 | Germany | 343/713 |

*Primary Examiner*—Eli Lieberman
*Attorney*—George B. White

[57] ABSTRACT

An arcuate strip of material provided with a threaded boss on which the base of the antenna can be secured; under each end of the strip is an adjustable clamping member the longitudinal slots of which are engageable by bolts extended through holes in the strip so as to adjust the clamps to the width of the roof of the automobile; claws on the ends of the clamps can be fitted over the drip molds on each side of the roof; the unit can be tightened by putting a perforated strip over the bolts at one end and then with a screw driver bear against the claw end of the strip to pull the opposite claw tightly under the mold and then by securing a remaining bolt fixing the unit firmly in position; on the under side of the arcuate strip there are a pair of spaced sponge wire cushions providing a groove inbetween for the lead wire from the antenna.

2 Claims, 7 Drawing Figures

Patented April 24, 1973
3,729,741
2 Sheets-Sheet 1
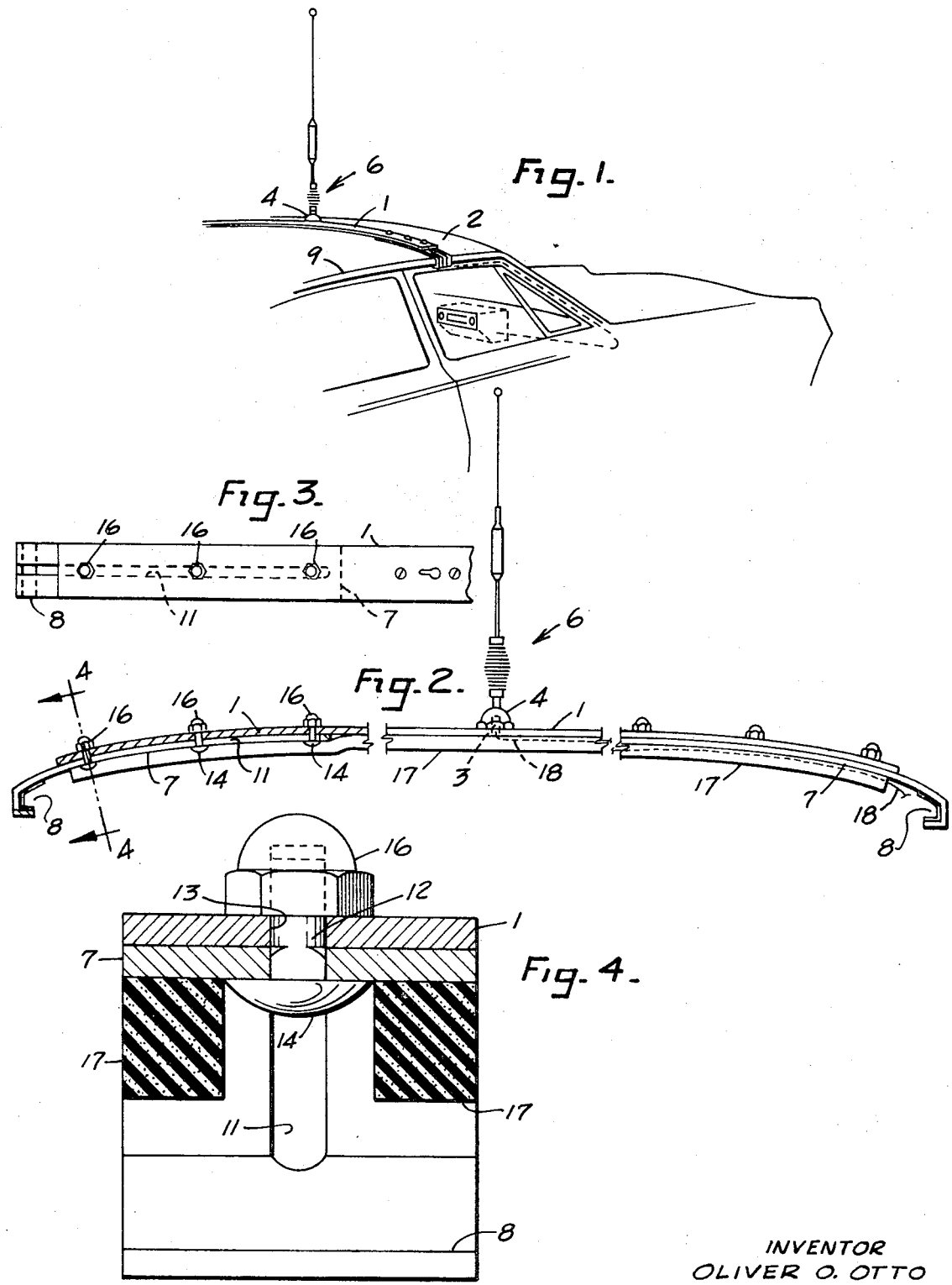
INVENTOR
OLIVER O. OTTO
BY George N. White
ATTORNEY

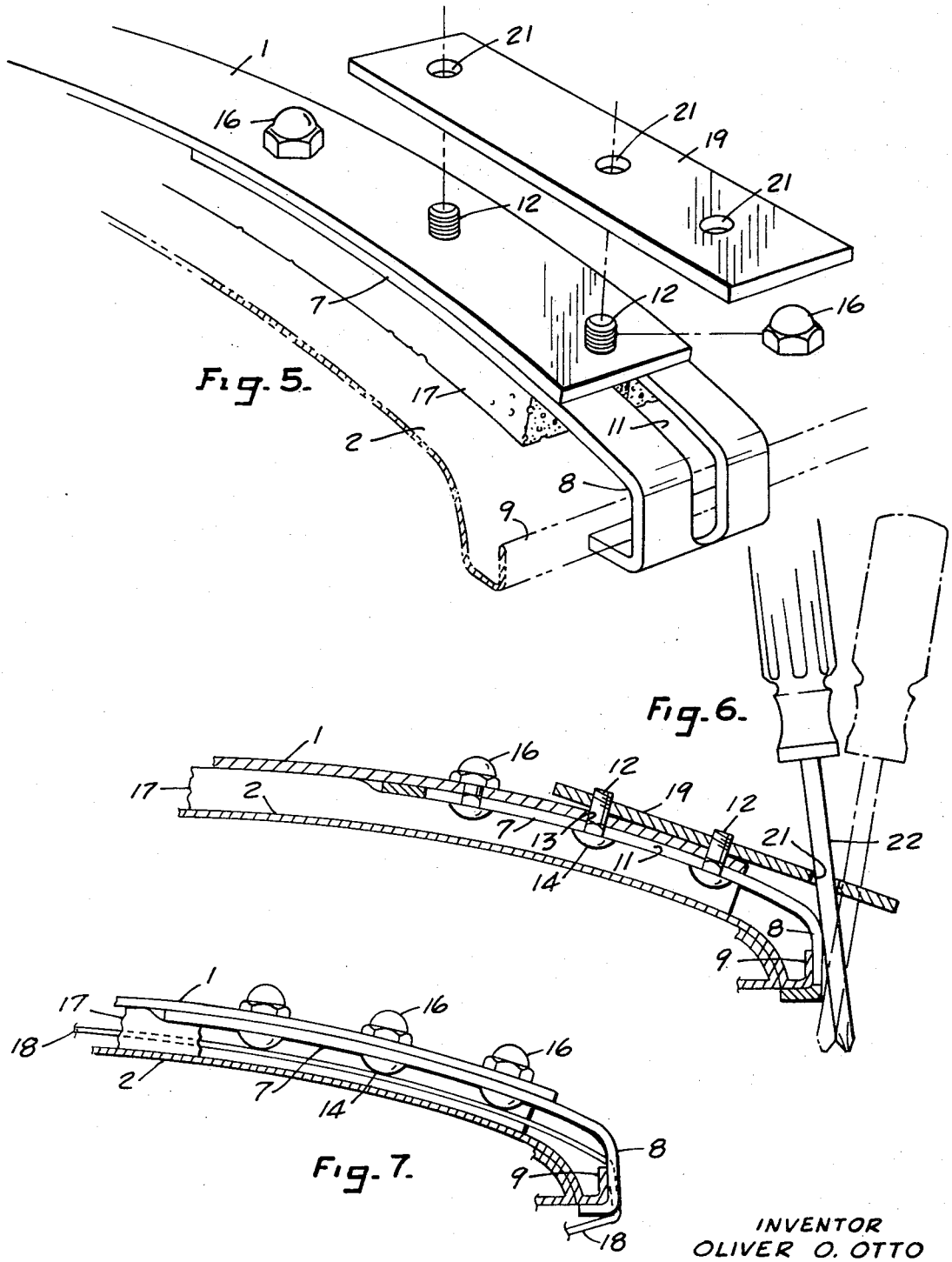

AUTOMOBILE ANTENNA SUPPORT

BACKGROUND OF THE INVENTION

It is the present practice in connection with heavy automobile antenna to drill a hole through the top of the automobile for securing the antenna mounting in position. This requires the removal of the lining of the roof of the automobile both for the mounting and in order to conceal the lead wires.

There are various antenna mounts on the trunks of an automobile or on brackets on automobile windows or on the edges of the roof of the automobile, but previous attempts to eliminate said disadvantages only involved the use of suction cups to support a platform for the antenna on the top.

The object of this invention is to overcome said disadvantages and to provide a firm fixed support for the heavy antennas, particularly the type which is used for two-way radios.

BRIEF DESCRIPTION OF DRAWINGS

FIG. 1 is a fragmental view of an automobile showing the position of the herein antenna mounting.

FIG. 2 is a partly sectional and partly fragmental detailed view of the mount.

FIG. 3 is a top plan view of one end of the mount.

FIG. 4 is a cross-sectional view taken on lines 4—4 of FIG. 2.

FIG. 5 is a fragmental perspective view showing the plate for tightening the clamp before placing into position.

FIG. 6 is a sectional fragmental view showing the tightening plate in position and a tightener bar such as a screw driver applied to it.

FIG. 7 is a fragmental sectional view of the mount.

DETAILED DESCRIPTION

An arcuate strip 1 substantially conforming to the curvature of the automobile top 2 has a threaded boss 3 at about the middle thereof on which is secured the base 4 of a two-way radio antenna 6.

Under each end of the strip 1 is an adjustable clamp 7 the outer end of which is formed into a claw 8 to fit under the usual drip mold 9 as shown in FIG. 5. Each clamp 7 has an elongated slot 11 which slideably engages a plurality of bolts 12 extended through holes 13 in the strip 1. The head 14 of each bolt 12 is underneath the clamp 7 as shown in FIG. 4, and a nut 16 can be tightened on each bolt 12 to fix the respective clamp 7 in adjusted position.

On the underside of the strip 1 are a pair of foam rubber cushions 17 which extend the entire length of the strip 1. The clamps 7 are inserted between the adjacent cushions 17 and the underside of the strip 1.

The threaded boss 3 is hollow so that a lead wire 18 from the antenna 6 may be extended through the strip 1 and along the space between the cushions 17 to one of the claws 8 and then through a suitable opening or above the door insulation of the automobile to the usual radio connection.

For insulation and also to protect the drip mold the underside of the clamping claws are suitably rubberized.

For installation or removal a strip of plate 19 is utilized. The plate 19 has holes 21 therein which correspond in spacing substantially to the spacing between the adjacent bolts 12 so that, if so desired, the plate may be held on at least two of the bolts 12. This plate 19 is used primarily for tightening the claws 8 in place. As illustrated in FIGS. 5 and 6, the nuts 16 are removed from at least two of the bolts 12 at one end of the strip 1 and the holes 21 of the plate 19 are placed over the respective bolts 12. Then a tightening rod such as a screw driver 22 is inserted in the third hole which is beyond and outside of the strip 1, and by exerting a pull on the plate 19 outwardly, while exerting inward pressure on the adjacent claw 8, the latter is pressed in tight engagement with the drip mold 9 while the opposite claw 8 is also pulled tightly against the opposite drip mold 9. While the device is held under tension in this manner, the nut 16 of the third bolt beyond the plate 19 is tightened so as to fix the adjustment. Thereafter the plate 19 may be removed and the nuts 16 later replaced on the respective bolts 12 as shown in FIG. 7.

If so desired, the bolts 12 may be made long enough to allow the threading of the nuts 16 against the plate 19 to hold the latter in position.

I claim:

1. An antenna mount for the top of an automobile, including
   an arcuate strip extended substantially the entire width of the top of the automobile but shorter than the width of said top,
   an adjustable clamp strip slideable under each end of said arcuate strip,
   a claw on the outer end of each clamp strip engageable with the adjacent edge of the top of the automobile,
   a plurality of fasteners extended through each clamp strip and through said arcuate strip to hold said clamp strip in adjusted position,
   hollow means at about the middle of said arcuate strip for engagement by an antenna and for accommodating the lead wire from the antenna to the underside of said strip,
   spacing cushions on the underside of said strip,
   said clamp fasteners being bolts extended through holes in said arcuate strip,
   each clamp strip having an elongated slot slideably engaging said bolts when said bolts are loosened, and
   means bearing against the top face of said arcuate strip for tightening said bolts to hold the respective clamp strips in adjusted position,
   a tension plate having holes engageable with the bolts adjacent one end said arcuate strip, and
   having a hole beyond said adjacent end of said arcuate strip for engagement by a tension element for exerting pressure against the adjacent claw and simultaneous tension on said arcuate strip in the opposite direction for tightening the engagement of said claws with the respective edges of said top.

2. The antenna mount specified in claim 1 and
   the said hollow means being a hollow externally threaded boss to accommodate said lead wire and
   said spacing cushions extending substantially the entire length of said arcuate strip.

* * * * *